United States Patent [19]

Sato et al.

[11] Patent Number: 4,851,921
[45] Date of Patent: Jul. 25, 1989

[54] MANUAL SWEEPING, IMAGE DATA PROCESSING APPARATUS

[75] Inventors: Takashi Sato, Higashiyamato; Teruo Sano, Kawasaki, both of Japan

[73] Assignee: Casio Computer Co., Ltd., Tokyo, Japan

[21] Appl. No.: 163,818

[22] PCT Filed: Jun. 12, 1987

[86] PCT No.: PCT/JP87/00381

§ 371 Date: Feb. 4, 1988

§ 102(e) Date: Feb. 4, 1988

[87] PCT Pub. No.: WO87/07805

PCT Pub. Date: Dec. 17, 1987

[30] Foreign Application Priority Data

Jun. 12, 1986 [JP] Japan ................... 61-134892
Sep. 30, 1986 [JP] Japan ................... 61-231910
May 7, 1987 [JP] Japan ................... 62-109702

[51] Int. Cl.⁴ ............................................. H04N 1/40
[52] U.S. Cl. ..................................... 358/474; 382/59
[58] Field of Search ............... 358/285, 286, 287, 288, 358/290, 293; 382/59; 340/670, 679; 324/175

[56] References Cited

U.S. PATENT DOCUMENTS

| | | |
|---|---|---|
| 3,541,248 | 11/1970 | Young . |
| 3,767,020 | 10/1973 | Rowe . |
| 4,037,157 | 7/1977 | Campbell ............................ 324/175 |
| 4,445,087 | 4/1984 | Mehnert ............................. 324/175 |
| 4,523,235 | 6/1985 | Rajchman ........................... 358/256 |
| 4,611,246 | 9/1986 | Nihei ................................... 358/256 |
| 4,626,925 | 12/1986 | Toyoda . |
| 4,684,998 | 8/1987 | Tanioka et al. ..................... 358/288 |
| 4,701,804 | 10/1987 | Toyoda et al. ..................... 358/280 |

FOREIGN PATENT DOCUMENTS

| | | |
|---|---|---|
| 0183980 | 6/1986 | European Pat. Off. . |
| 55-115773 | 2/1979 | Japan . |
| 54-163614 | 12/1979 | Japan . |
| 61-1168 | 1/1986 | Japan . |
| 0214764 | 9/1987 | Japan . |
| 0234460 | 10/1987 | Japan . |
| 0258549 | 11/1987 | Japan . |

Primary Examiner—Howard W. Britton
Assistant Examiner—Kim Yen Vu
Attorney, Agent, or Firm—Frishauf, Holtz, Goodman & Woodward

[57] ABSTRACT

A manual sweeping, image data processing apparatus has a housing (1). When the housing (1) is moved, in contact with an original or a sheet of recording paper, the apparatus can read data from the original, or print data on the recording paper. Within the housing (1), there are provided a reading section (2) for optically reading data, a printing section (3) for printing image data, a memory (60) for storing the data read by the reading section (2), and an encoder (39) for detecting the distance for which the housing (1) has been moved relative to the original or the recording paper. The apparatus further comprises a buzzer (7a) and an LED (10), both for indicating the speed of the housing (1) or informing that the speed of the housing (1) falls outside an appropriate range, in accordance with the signal output from the encoder (39).

6 Claims, 14 Drawing Sheets

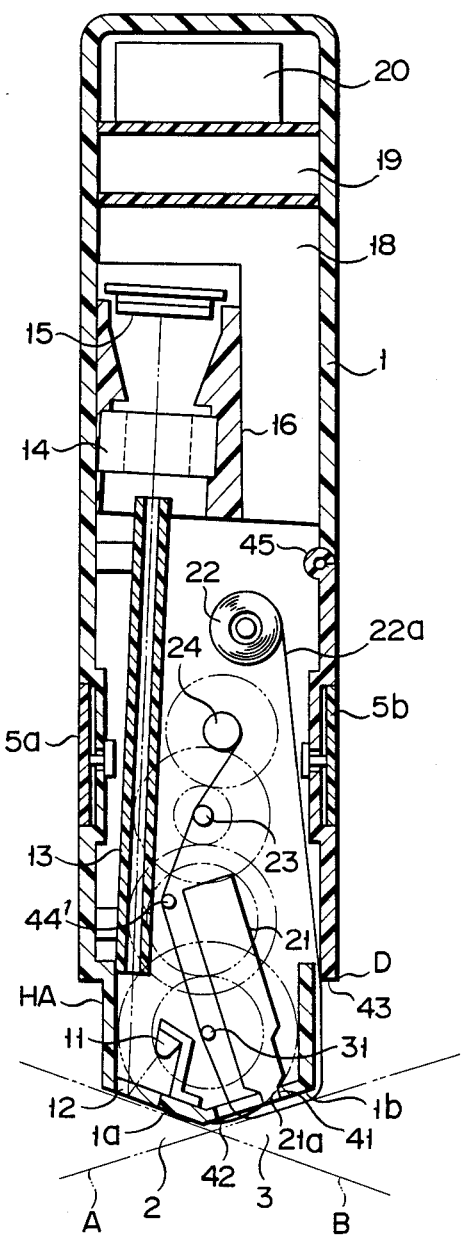
F I G. 2b

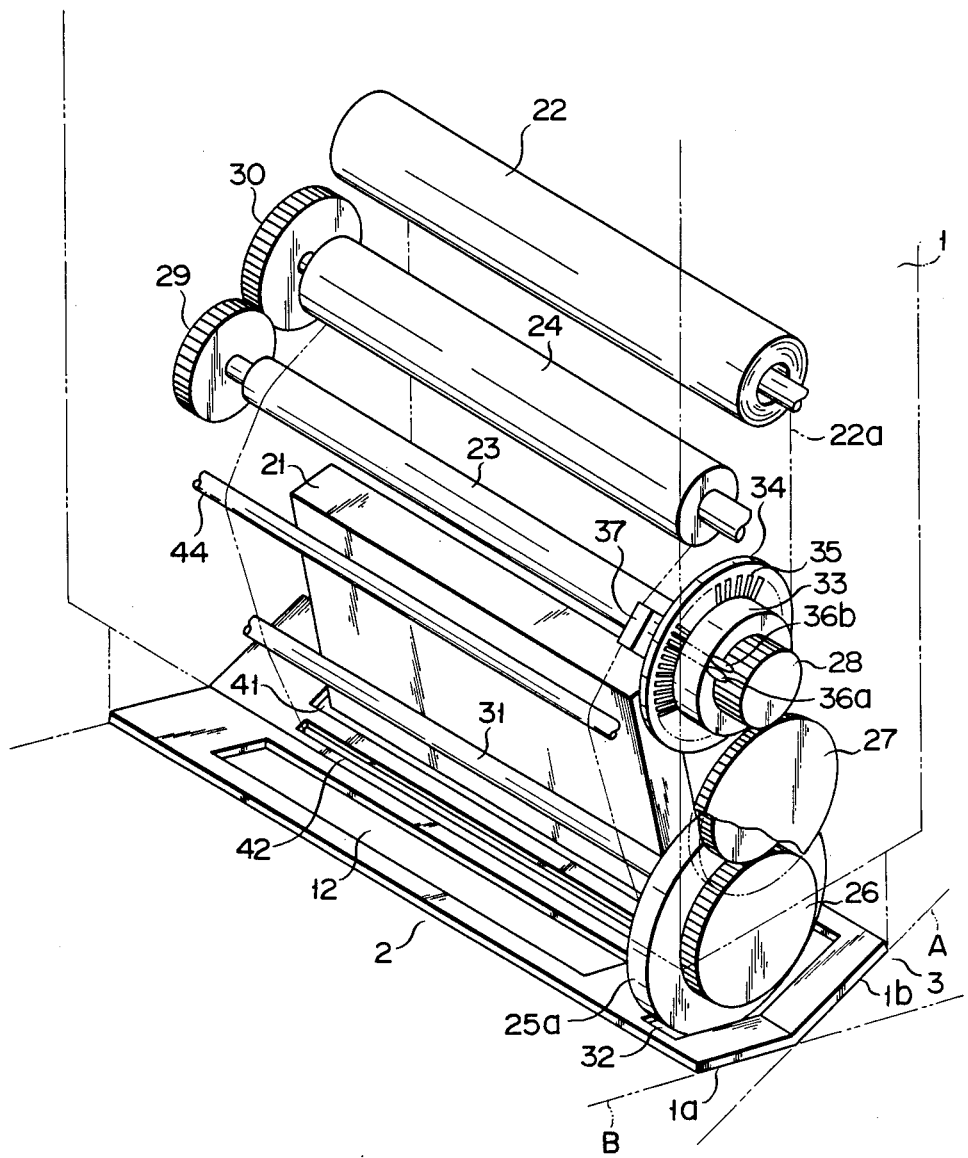
F I G. 3

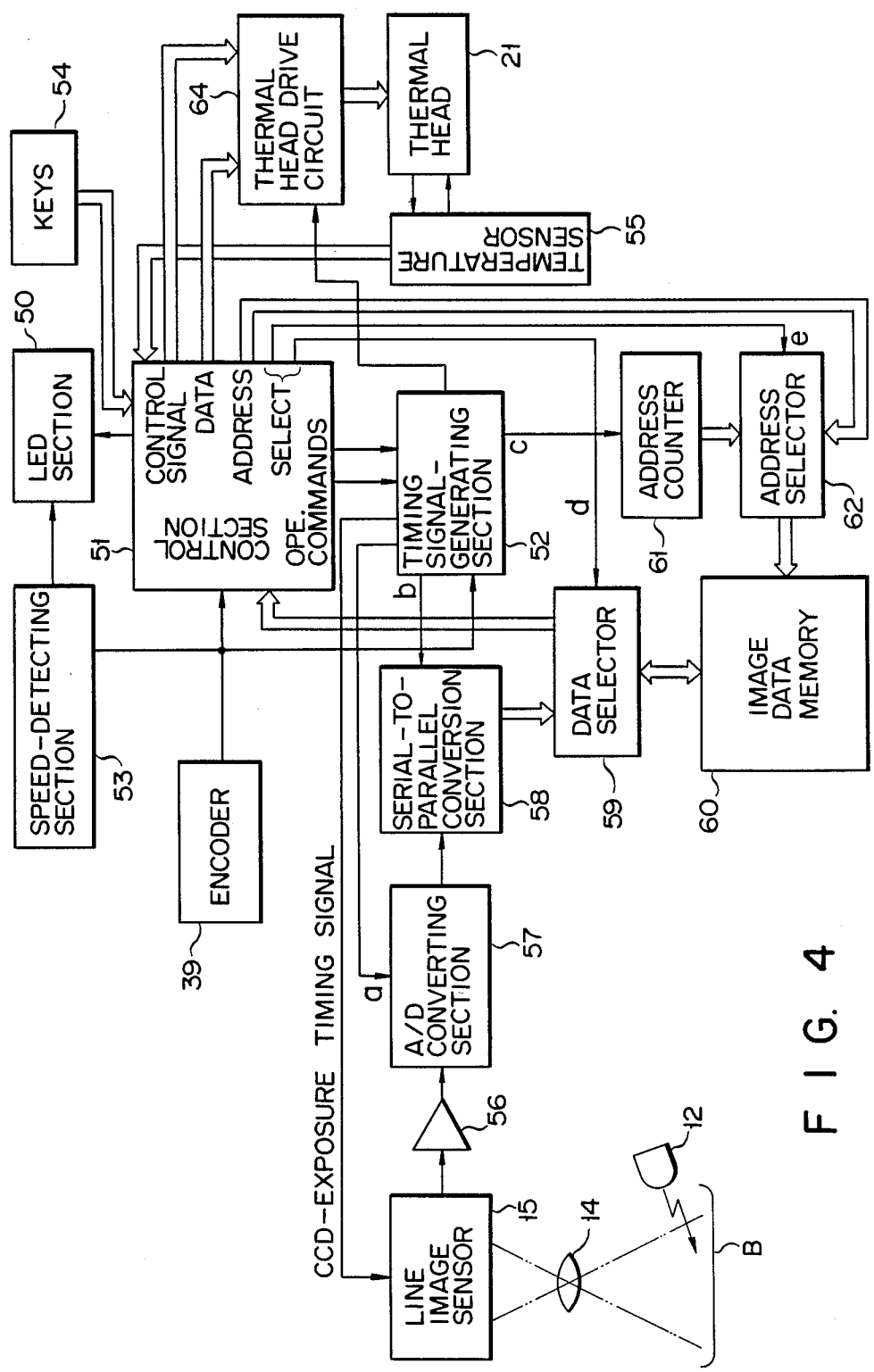
F I G. 4

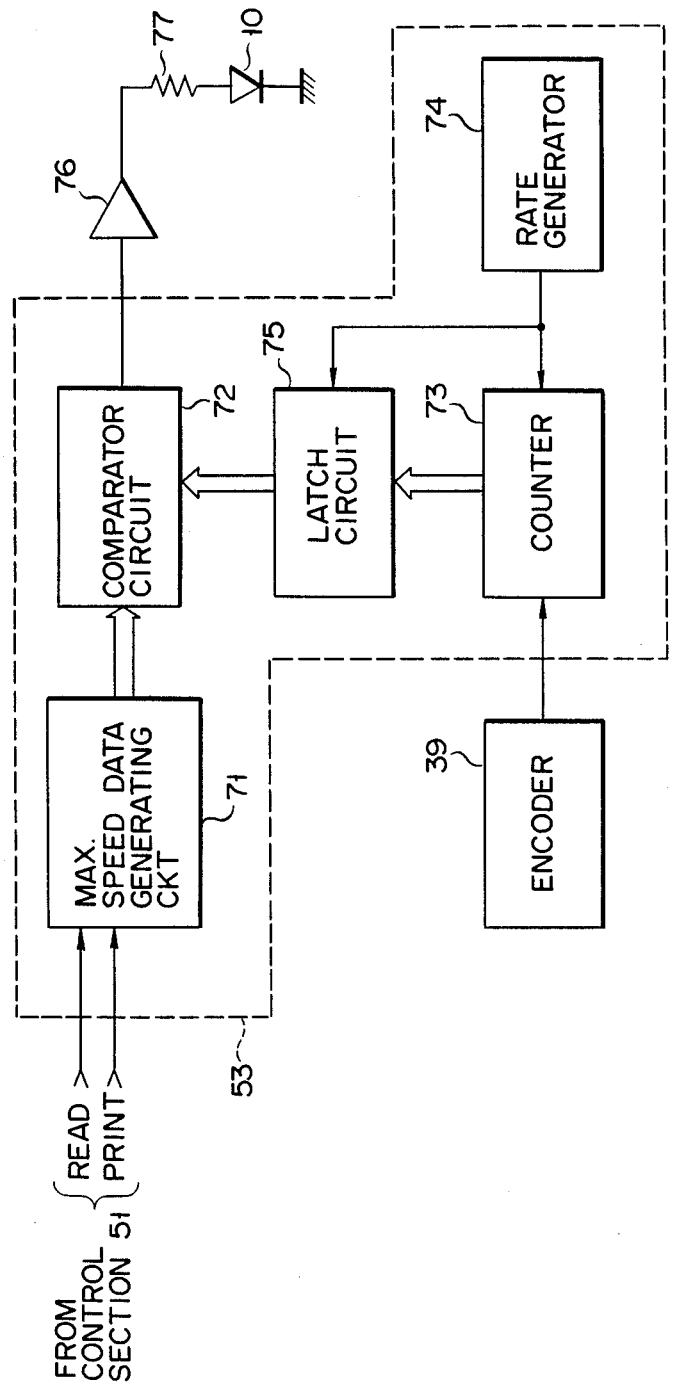
F I G. 5

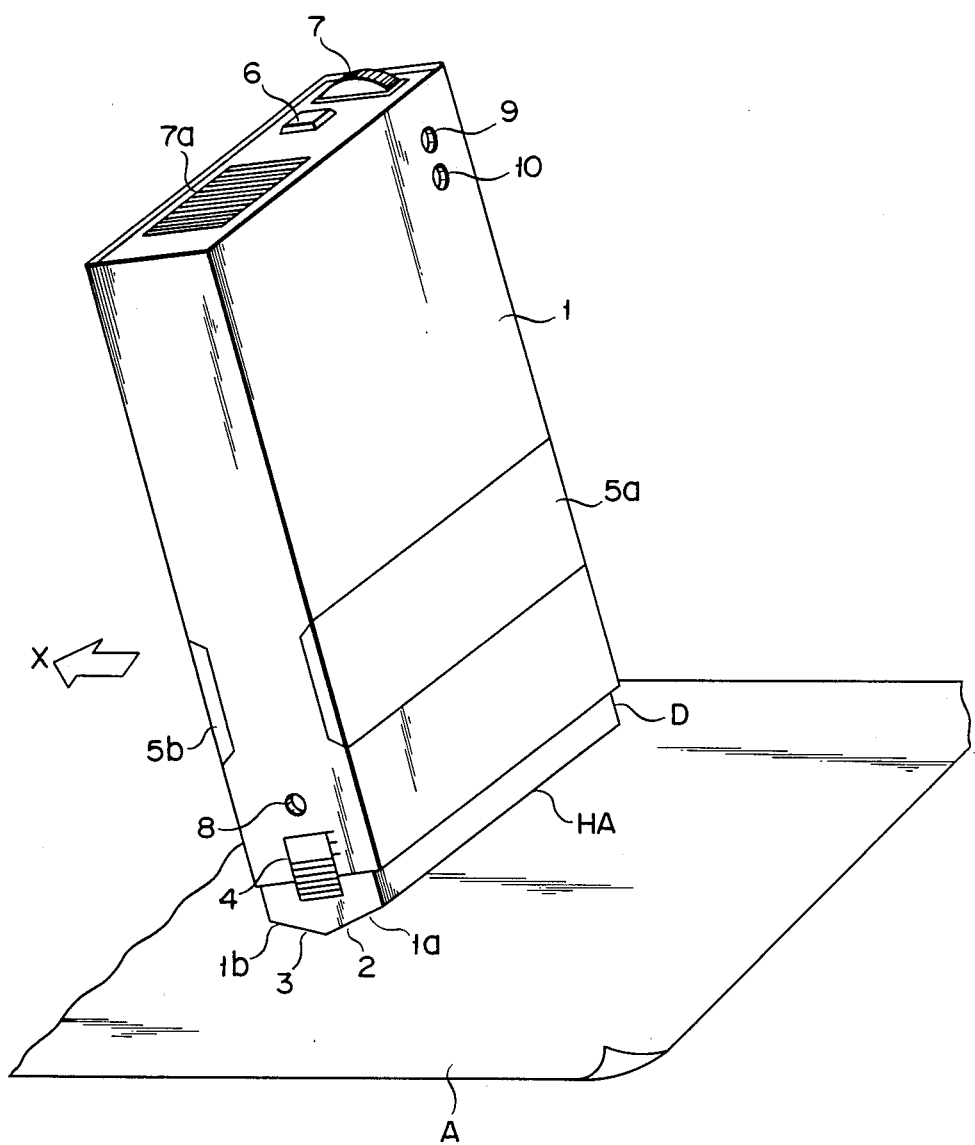
F I G. 6

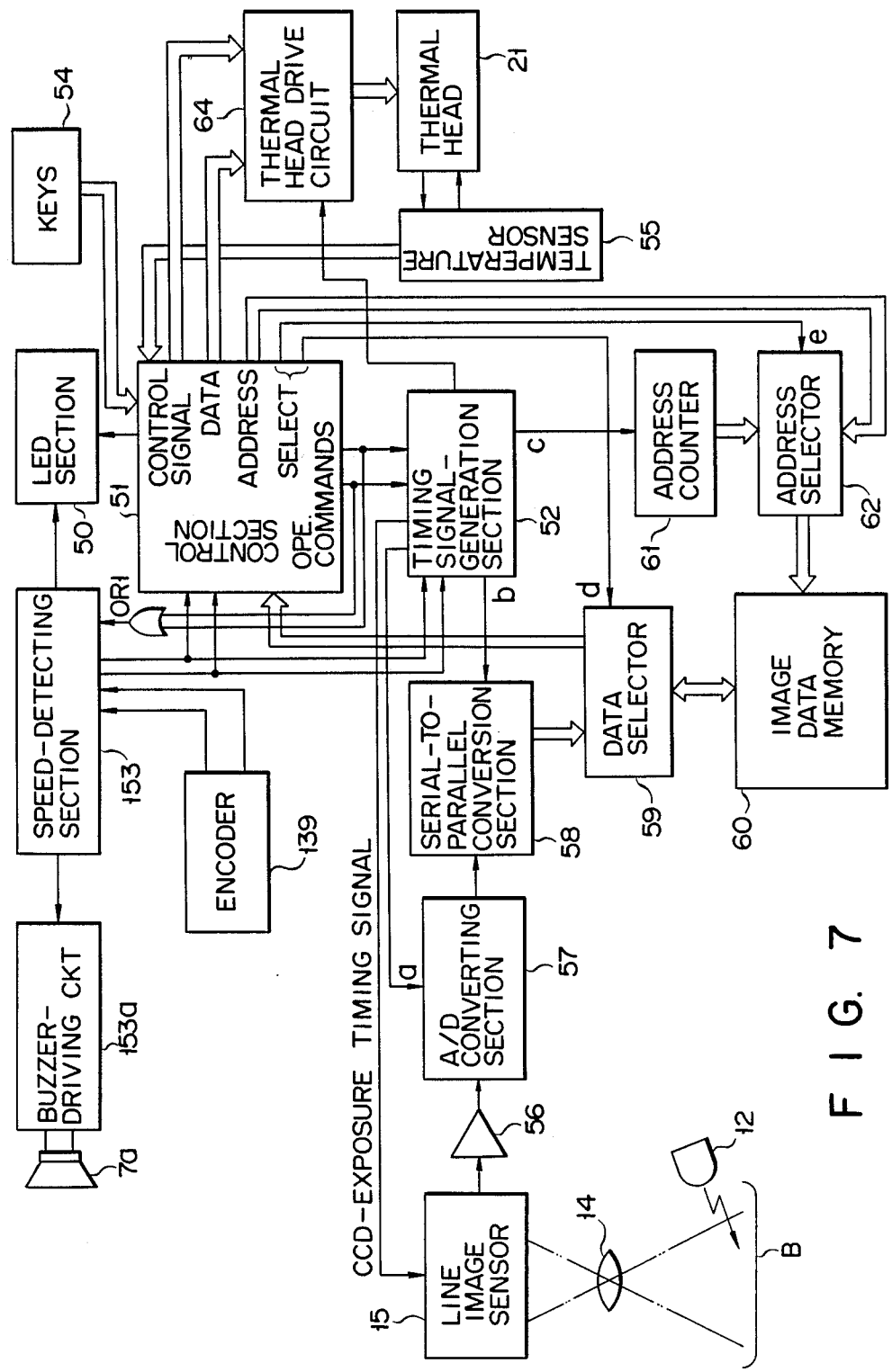
F I G. 7

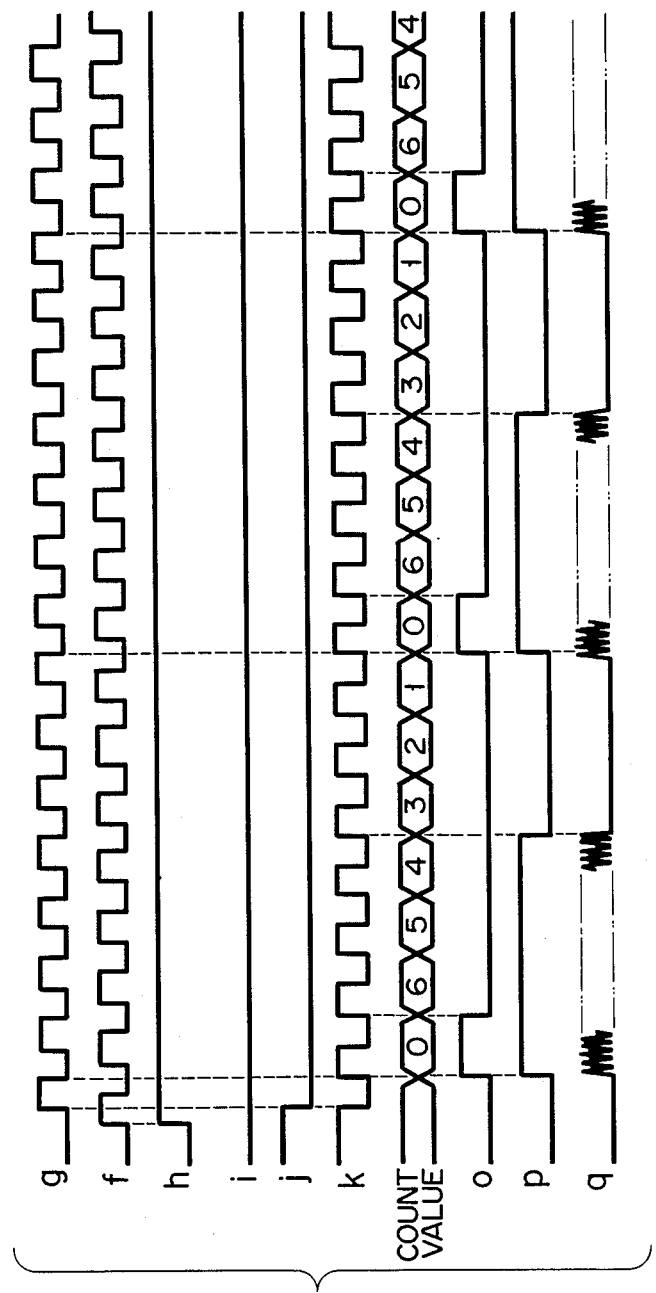
F I G. 10

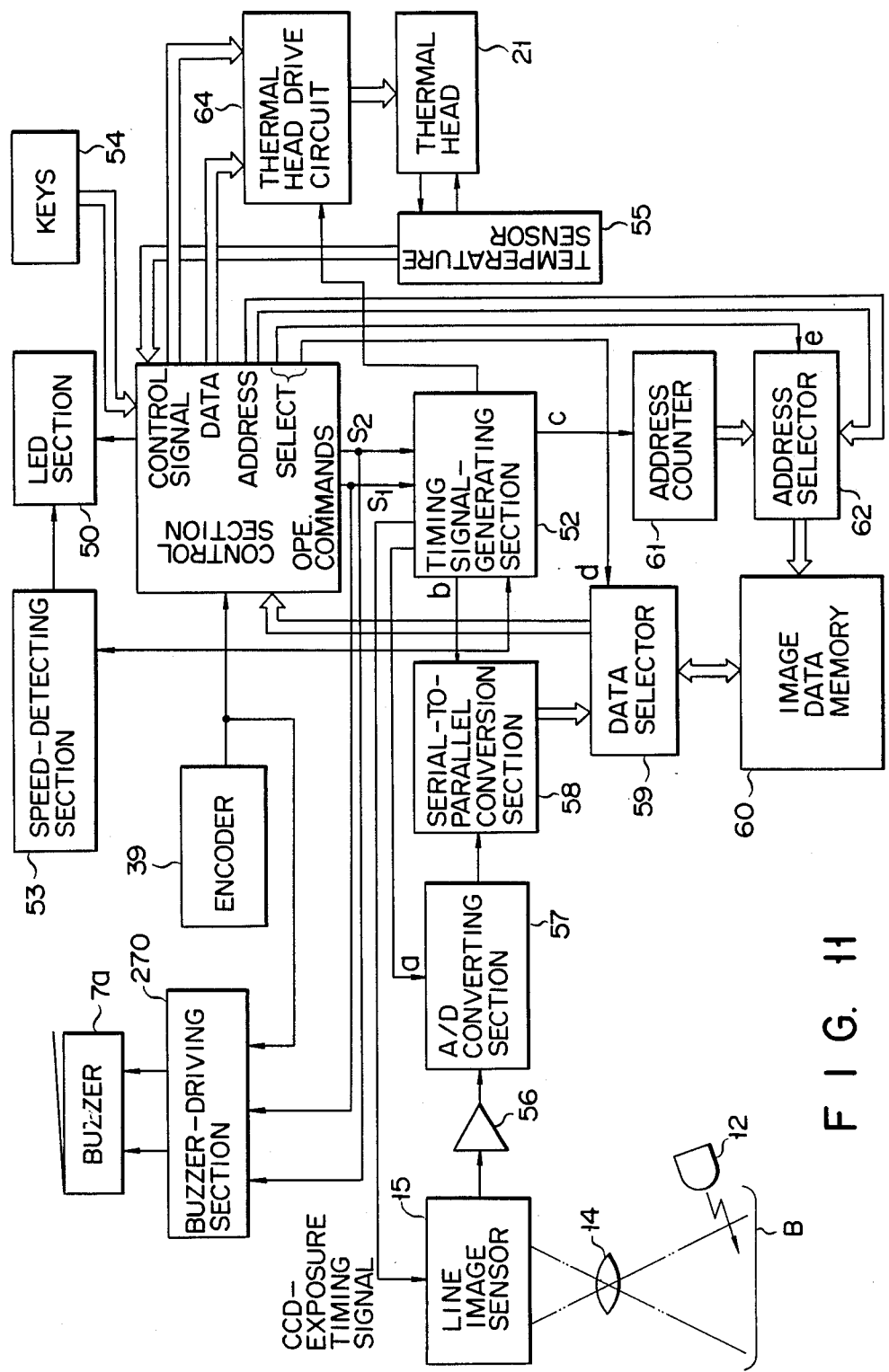
F I G. 11

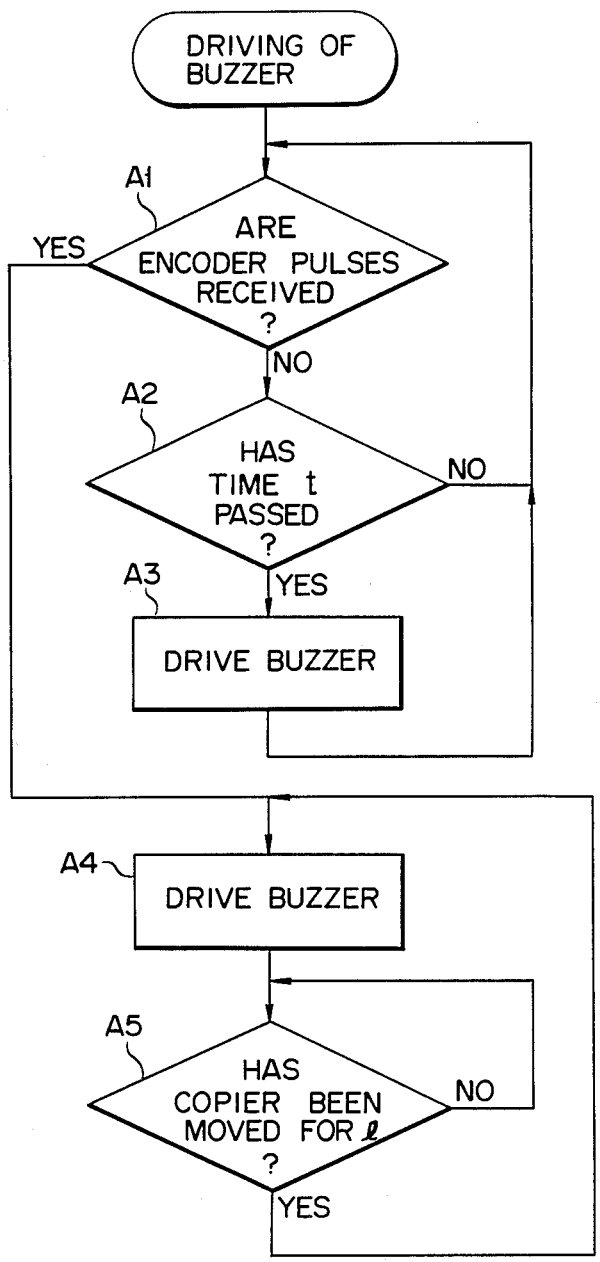
F I G. 13

MANUAL SWEEPING, IMAGE DATA PROCESSING APPARATUS

TECHNICAL FIELD

The present invention relates to an image data processing apparatus whose main body can be manually moved to read image information from an original and/or to print information.

BACKGROUND ART

Japanese Patent Disclosure No. 55-115773 discloses a "manual sweeping copier" whose main body is manually moved, thus to read image information from an original and/or to print information.

The manual sweeping copier has an encoder. The encoder detects the distance the main body of the copier has been moved, and produces encoder pulses. Information is read and printed in synchronism with the encoder pulses.

Since the main body of such a manual sweeping apparatus is moved by hand, it is difficult to move the main body at a constant speed. There is a possibility that the main body is moved at a speed above the optimum value for reading information or printing information.

With a manual sweeping, image data processing apparatus of the type described above, it is difficult to achieve a high-quality reading of information and a high-quality printing of information. There is the possibility that errors are made in reading or printing information.

TECHNICAL SUBJECT

It is an object of the present invention to provide an apparatus which can inform an operator whether or not the operator is moving the main body of the apparatus at a speed suitable for reading information or printing information.

Another object of the invention is to provide an apparatus which enables an operator to move its main body at a constant speed.

To attain these objects, according to the invention, there is provided a manual sweeping, image data processing apparatus which comprises:

a housing small enough to be held in a hand and moved;

image data processing means provided within the housing, for reading information from an original while the housing is being moved in contact with the original, and/or printing information on a sheet of recording paper while the housing is being moved in contact with the recording paper;

distance detecting means for detecting the distance for which the housing has been moved relative to the original or the recording paper while in contact with the original or the recording paper;

control means for controlling the image data processing operation being achieved by the image data processing means, in accordance with the data output by the distance detecting means; and indicating means for indicating a specific item of information on the basis of the data output by the distance detecting means.

The manual sweeping, image data processing apparatus of the present invention can, therefore, be moved at a speed suitable for reading or printing information, and can be moved at a constant speed. Since the apparatus can be moved at a constant speed, the possibility that errors occur during the reading or printing of information is very greatly reduced. Further, since the moving speed of the apparatus is not unstable, the apparatus can accomplish a high-quality reading of information and a high-quality printing of information.

BRIEF DESCRIPTION OF THE DRAWINGS

FIG. 2(b) is a sectional view, taken along line II—II in FIG. 2(a).

FIG. 3 is a perspective view showing the main components arranged within the copier.

FIG. 4 is a block diagram showing an electronic circuit.

FIG. 5 is a block diagram showing, in detail, the speed-detecting section shown in FIG. 4.

FIG. 6 is a perspective view showing the outer appearance of a second embodiment of this invention.

FIG. 7 is a block diagram showing the entire electronic circuit.

FIG. 10 is a timing chart showing the waveforms of the signals used in the speed-detecting section and the buzzer-driving circuit, both shown in FIG. 8, when the apparatus is set in a printing mode.

FIG. 11 is a block diagram showing the entire electronic circuit of a third embodiment of the present invention.

FIG. 13 is a flow chart explaining how an alarm sound is given before and after sweeping.

DESCRIPTION OF THE PREFERRED EMBODIMENTS

Figure 1:
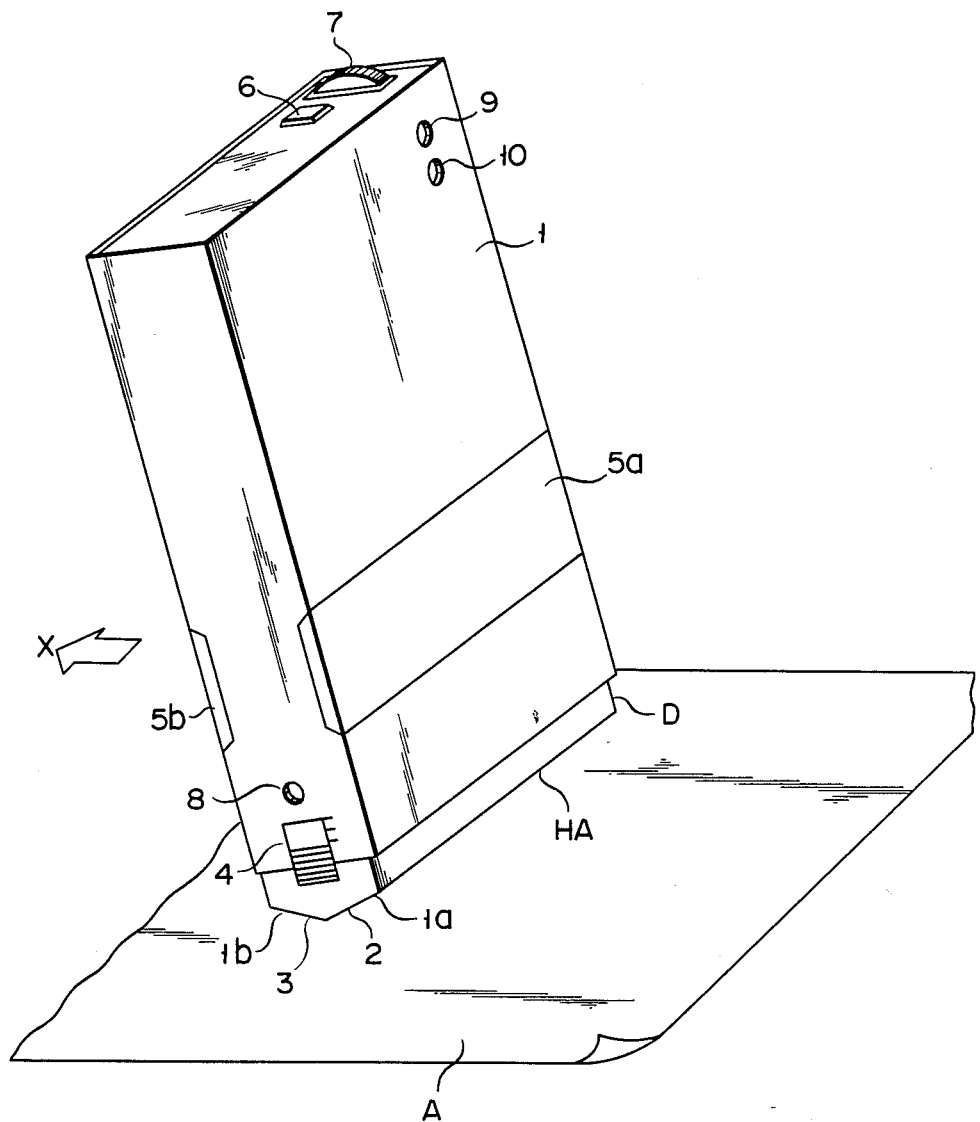
FIG. 1 is a perspective view showing an outer appearance of a handy copier of a first embodiment of the present invention.

The first to third embodiments of the present invention will be described with reference to the accompanying drawings. FIG. 1 is a perspective view showing the outer appearance of a hand-held copier which is the first embodiment of the present invention. In FIG. 1, numeral 1 designates the housing of the hand-held copier, which is 70 mm wide, 30 mm thick, and 160 mm high. The copier can read and print an image on an original having a maximum width of 40 mm and can read an image having a maximum length of 200 mm. It can read and print an image in a resolution of 8 dots/mm at most. Head section HA, which is designed to read and print an image, is attached to the distal end (or the lower end) of housing 1. Head section HA is less wide and less thick than housing 1. Therefore, stepped portion D is formed between head section HA and housing 1. The distal end of head section HA comprises two long, narrow inclined surfaces 1a and 1b. These surfaces are joined at their lower sides, thus forming a ridge. Reading section 2 is mounted on surface 1a, and printing section 3 is mounted on surface 1b. Power/read/print switch 4 is provided on one side of housing 1, and located at the lower end of this side. Operation switches 5a and 5b are provided on the opposing front and rear surfaces of housing 1, respectively. Operation switches 5a and 5b are shaped like plates. That portion of housing 1 on which these switches are provided, can be held between the operator's thumb and fingers, so that housing 1 of the hand-held copier can be moved back and forth by hand. Power/read/print switch 4 is operated to turn the copier on or off, and to set the copier in a reading mode or a printing mode. More precisely, when switch 4 is operated to select either the reading mode or the printing mode, the power supply to the copier is started. Further, clear key 6, and density control dial 7 for controlling the print density are provided on the proximal (or upper) end of housing 1. Clear key 6 is pushed to clear an image memory (later described in detail) when the hand-held copier is set in the reading mode, and to initialize the address of the image data memory when the copier is set in the printing mode. LED 8 is provided near reading section 2 and used as a power-supply pilot lamp. LEDs 9 and 10 are provided on the front surface of housing 1, and located near the proximal end of housing 1. LED 9 is a memory pilot lamp, and LED 10 is a speed alarm lamp.

In order to read image data from an original by the hand-held copier, power/read/print switch 4 is moved to a "read" position. The copier is thereby turned on, and LED 8 emits light. The operator holds the copier and sweeps it across the original, while depressing both operation keys 5a and 5b and keeping reading section 2 in contact with the original. When the copier is moved across the original at a speed higher than a predetermined value, LED 10 emits light, thereby informing the operator of this fact.

To print the image data read from the original, power/read/print switch 4 is moved to a "print" position. Then, the copier is held and moved across a piece of ordinary paper A, in the direction of arrow X, while depressing both operation switches 5a and 5b and keeping printing section 3 in contact with paper A. As a result, the image data is printed on paper A.

Figure 2A:
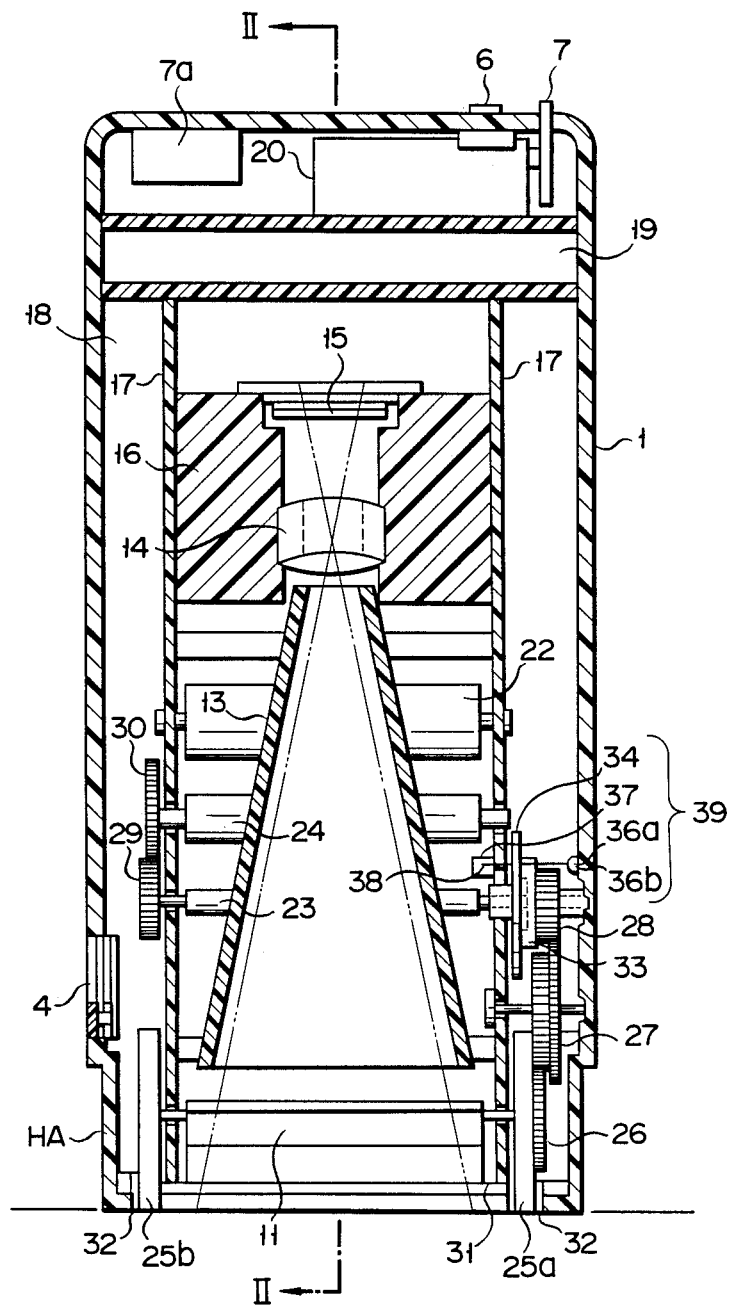
FIG. 2(a) is a sectional view showing the internal structure of the apparatus shown in FIG. 1.

Reading section 2 and printing section 3, both provided within housing 1, will now be described in detail with reference to FIGS. 2(a) and 2(b). As is shown in FIGS. 2(a) and 2(b), reading section 2 includes light source 11 made of an LED array and located close to inclined surface 1a. The light emitted from this light source is applied through window 12 made in inclined surface 1a and illuminates the original B. In housing 1, light guide 13 is arranged, and lens 14 and line image sensor 15 are located above light guide 13 spaced apart from each other for a predetermined distance. The line image sensor 15 is, for example, a 1024-bit CCD. Of 1024 bits, 320 bits are used to read an image having a maximum width of 40 mm, in a resolution of 8 dots/mm. Lens 14 and line image sensor 15 are held in specified positions by supporting member 16. This supporting member 16 is fastened to inner frame 17 provided within housing 1 and spaced apart from the inner surfaces of housing 1 by a predetermined distance. Space 18 for accommodating electronic parts is provided within housing 1, at one side of supporting member 16. Space 19 for accommodating a battery is also provided within housing 1, and is located above supporting member 16. Line image sensor 15 is connected to a circuit board (not shown) located in space 18. Clear key 6, density control dial 7, and the like, are connected to circuit board 20.

Within inner frame 17, as shown in FIG. 3, there are provided thermal head 21, ink ribbon roll 22, roller 23 for feeding ribbon 22a at a constant speed, and ribbon take-up roller 24. Rubber rollers 25a and 25b, and gears 26, 27, 28, 29, and 30 are provided in the space between inner frame 17 and the inner surfaces of housing 1. Rubber rollers 25a and 25b are rotatably mounted on shaft 31 extending horizontally across inner frame 17 and protruding at both ends from inner frame 17. Parts of their peripheries protrude outwardly through slits 32 cut in the end portions of inclined surfaces 1a and 1b. Gear 26, which has a smaller diameter than rubber rollers 25a, is coupled to gear 28 by intermediate gear 27. Gear 28 is coupled by clutch 33 to the shaft of ribbon-feeding roller 23. Clutch 33, which is of a one-way type, transmits the rotation of gear 28 to ribbon-feeding roller 23 only when the hand held copier is moved to print image data. Encoder disk 34 is fastened to the input-end of clutch 33. Encoder 34 can rotate, independently of the operation of one-way clutch 33, when gear 28 rotates. As is shown in FIG. 3, encoder disk 34 has a number of radial slits 35 located at regular intervals in the circumferential direction of disk 34. LEDs 36a and 36b are located at one side of disk 34, and photosensor 37 is provided at the other end of disk 34. As is illustrated in FIG. 2(a), LEDs 36a and 36b are secured to the inner surface of housing 1, and photosensor 37 is fastened to the inner surface of inner frame 17. Hole 38 is cut in frame 17, positioned coaxially with photosensor 37. Hence, the light emitted from LEDs 36a, 36b can be applied to photosensor 37 through slits 35 of encoder disk 34 and through hole 38. Encoder disk 34, LEDs 36a and 36b, and photosensor 37 constitute encoder 39.

As is shown in FIG. 3, printing window 41 and ribbon-guiding window 42 are cut in inclined surface 1b and extend parallel to each other. Ribbon-guiding window 42 is located closer to inclined surface 1b than printing window 41. Thermal head 21 has heating section 21a (FIG. 2(b)), which is inserted in printing window 41. Heating section 21a slightly protrudes from inclined surface 1b. Slit 43 is cut in stepped portion D close to that side of housing on which operation key 5b is provided. Thermal-transfer ink ribbon 22a fed out of roll 22 is led from housing 1 through slit 43, and then guided into housing 1 through ribbon-guiding window 42 after passing heating section 21a of thermal head 21. Within housing 1, ink ribbon 22a is guided by shaft 31, ink ribbon guide 44 and constant-speed ribbon-feeding roller 23, and is finally taken up around ribbon take-up roller 24. Further, as is shown in FIG. 2(b), the lower half of that side of housing 1 on which operation switch 5b is mounted can be opened when pivoted around hinge 45. When the lower half of this side is open, used ribbon roll 22 can be replaced with a new one, and the interior of housing 1 can be inspected.

The electronic circuit formed on circuit board provided within space 18 will now be explained with reference to FIG. 4. As has been described, encoder 39 comprises encoder disk 34, LEDs 36a and 36b, and photosensor 37. Encoder 39 outputs pulse signals representing the distance over which housing 1 has been moved. In other words, it outputs a distance signal. Encoder 39 produces two pulse signals which are different in phase, and can detect not only the distance over which housing 1 has been moved, but also the direction in which housing 1 has been moved. Nonetheless, for simplicity's sake, it is assumed that in this embodiment encoder 39 generates only one pulse signal representative of the distance. The signal output from encoder 39 is supplied to control section 51, timing signal-generating section 52, and speed-detecting section 53. Control section 51 supplies a reading-mode signal or a printing-mode signal, in accordance with the selected mode, to speed-detecting section 53. Speed-detecting section 53 determines, from the output signal of encoder 39, whether or not housing 1 of the hand-held copier is being moved at a speed higher than a predetermined value. When the speed of housing 1 rises above this value, section 53 detects this condition, and turns on speed-alarm LED 10. Operation signals are supplied to control section 51 from power/read/print switch 4, operation switches 5a and 5b, clear key 6, density control dial 7, of keys 54. Further, a temperature signal is supplied to section 51 from temperature sensor 55 which has detected the temperature of thermal head 21. A power-source voltage detector, though not shown, is provided in control section 51. Control section 51 controls power-supply pilot LED 8 and memory pilot LED 9 of LED section 50, and controls the other components of the circuit. When power/read/print switch 4 is operated, thus designating the reading mode or the printing mode, control section 51 gives an operation command to timing signal-generating section 52. Timing signal-generating section 52 generates various timing signals such as CCD-exposure timing signals at regular intervals in response to the command supplied from control section 51. It also generates a predetermined number of read-timing signals a, serial-to-parallel conversion signals b, and clock pulses c, in synchronism with the output signal of encoder 39 which represents the distance the read-timing signals the hand-held copier has been moved. The CCD-exposure timing signals output from timing signal-generating section 51 are supplied to line image sensor 15. Read-timing signals a are supplied to A/D converting section 57. Serial-to-parallel conversion signals b are supplied to serial-to-parallel conversion section 57. Clock pulses are supplied to address counter 61. Line image sensor 15 receives the light reflected from original B in synchronism with the CCD-exposure timing signals, and produces output signals. The output signals of the image sensor is output to A/D converting section 57 via amplifier 56. A/D converting section 57 converts these signals into binary signals, i.e., black signals and white signals, in synchronism with read-timing signals a. The binary signals are supplied to serial-to-parallel conversion section 58. Serial-to-parallel conversion section 58 converts the input signals into, for example, an 8-bit parallel signal. This parallel signal is output to image data memory 60 via data selector 59. Data selector 59 is connected to control section 51 by a data line. In accordance with selection signal d supplied from section 51, data selector 59 selects serial-to-parallel conversion section 58 or control section 51. Any desired write address of image data memory 60 (a row-address and a column-address) is designated by the output of address counter 61 and designated by address selector 62. Any desired read address of image data memory 60 is given by control section 51 through address selector 62. In accordance with selection signal e supplied from section 51, address selector 62 selects address counter 61 when the copier is set in the reading mode, and selects control section 51 when the copier is set in the printing mode, thereby to designate desired addresses of image data memory 60.

When the hand-held copier is set in the printing mode after the image has been read from the original, control section 51 sequentially reads the data stored in image data memory 60 through data selector 59, in response to the output signal of encoder 39. After reading the image data from image data memory 60, control section 51 calculates the time for supplying power to thermal head 21, on the basis of the temperature of head 21 detected by temperature sensor 55, the data output by the power-source voltage detector, and the density selected by turning density control dial 7. The data representing this power-supplying time is output as print data to thermal head drive circuit 64. In accordance with this print data, thermal head drive circuit 64 drives thermal head 21 in synchronism with the timing signals supplied from control section 51.

Speed-detecting circuit 53 will be described in greater detail with reference to FIG. 5. In FIG. 5, numeral 71 denotes a maximum speed data-generating circuit. Circuit 71 is designed so as to generate, in response to a reading-mode signal or a printing-mode signal supplied from control section 51, maximum speed data representative of the highest speed at which housing 1 can be moved to read or print data. The maximum speed data is output to comparator circuit 72. Numeral 73 designates a counter. Counter 73 counts the pulses output from encoder 39 and representing the distance the copier has been moved. The count value of this counter 73 is output to latch circuit 75 in accordance with the pulses generated by rate generator 74 at a predetermine frequency. Latch circuit 75 latches the output of counter 73 in synchronism with the pulses supplied from rate generator 74, and then outputs it to comparator circuit 72. Comparator circuit 72 compares the data output from latch circuit 75 with the maximum speed data supplied from maximum speed data-generating circuit 71. Circuit 72 outputs a "1" signal when the data latched by circuit 75 is greater than the maximum speed data. The output of comparator circuit 72 is supplied to driver 76 as the output of speed-detecting circuit 53. The output of driver 76 is supplied via resistor 77 to LED 10 which whereby LED 10 is driven and functions as a speed alarm lamp.

The operation of the embodiment described above will now be explained. To read the image data, such as characters and an image, from an original, a user moves power/read/print switch 4 from a "power off" position to the "read" position. Therefore, power is supplied to the circuit components. At this time, control circuit 51 turns on LED 8 of LED section 50, thereby informing that the copier has been turned on. Further, control section 51 outputs a reading-mode signal to speed-detecting circuit 53. In response to the reading-mode signal, speed-detecting circuit 53, more precisely maximum speed data-generating circuit 71, generates the data representing the highest speed at which housing 1 can be moved to read data. This data is output to comparator circuit 72. Then, the user sweeps housing 1 across original B forwardly of operation switch 5a, as is shown in FIG. 2(b), while keeping reading section 2 in contact with original B and depressing both operation switches 5a and 5b. The light emitted from light source 11 is applied onto original B though window 12 cut in inclined surface 1a. The light is reflected from original B and guided by light guide 13. The light is finally applied via lens 14 to line image sensor 15. As the housing 1 of the hand-held copier is thus moved, rubber rollers 25a and 25b, both contacting original B, are rotated. The rotation of these rubber rollers is transmitted to gear 28 by gears 26 and 27. Hence, gear 28 is rotated, whereby encoder disk 34 rotates at a speed proportional to the speed at which housing 1 is being moved. As encoder disk 34 rotates in this manner, the light emitted from LED 36 is intermittently applied to photosensor 37 through slits 35. Photosensor 37 produces pulses, thus generating a pulse signal. This pulse signal, which represents the distance the copier has been moved, is supplied to control section 51, timing signal-generating section 52, and speed-detecting section 53. Counter 73 of section 53 counts the pulses output from encoder 39, thereby generating data representing the speed at which the copier is being moved. This data is output to latch circuit 75 in synchronism with the pulses supplied from rate generator 74. Counter 73 is reset after its count value has been output to latch circuit 75, and then starts counting pulses output by encoder 39. Latch circuit 75 latches the count value of counter 73, i.e., the speed data, in synchronism with the pulses supplied from rate generator 74. The output data of latch circuit 75 is input to comparator circuit 72. Comparator circuit 72 compares the speed data, which is latched in latch circuit 75 and represents the speed of housing 1 of the copier, with the maximum speed data supplied from maximum speed data-generating circuit 71. If the speed data latched in circuit 75 has not reached the maximum speed data, comparator circuit 72 produces a "0" signal. As housing 1 of the hand-held copier is moved faster, the speed data latched in latch circuit 75 may become greater than the maximum speed data output from maximum speed data-generating circuit 71. If this is the case, comparator circuit 72 outputs a "1" signal. This "1" signal is supplied to driver 76, and driver 76 drives LED 10 (the speed alarm lamp). LED 10 emits light, thus informing the user that housing is being swept too fast.

In the meantime, timing signal-generating section 52 keeps generating CCD-exposure timing signals at regular intervals. These CCD-exposure timing signals are supplied to line image sensor 15. Timing signal-generating section 52 also generates read-timing signals a and serial-to-parallel conversion signals b, in synchronism with the pulses supplied from encoder 39. The read-timing signals a are supplied to A/D converting section 57, and the serial-to-parallel conversion signals b are output to serial-to-parallel conversion section 58. Further, timing signal-generating section 52 generates clock pulses c in synchronism with serial-to-parallel conversion signals b. These clock pulses are output to address counter 61.

Line image sensor 15 produces image signals from the light reflected from original B, in synchronism with CCD-exposure timing signals output from timing signal-generating section 52. The image signals are amplified by amplifier 56 and then supplied to A/D converting section 57. A/D converting section 57 converts the image signals output from amplifier 56, into a serial digital signal, in synchronism with read-timing signals supplied from timing signal-generating section 52. The digital signal is input to serial-to-parallel conversion section 58. Serial-to-parallel conversion section 58 converts the serial digital signal into, for example, 8-bit parallel image data, in synchronism with serial-to-parallel conversion signal b supplied from timing signal-generating circuit 52. The 8-bit image data is output to data selector 59. Data selector 59 selects the output of serial-to-parallel conversion section 58 in response to select signal d supplied from control section 51 when the copier is set in the reading mode. Therefore, the image data output from serial-to-parallel conversion section 58 is supplied via data selector 59 to image data memory 60. All addresses of image data memory 60 are designated by address selector 62. At this time, address selector 62 selects the output of address counter 61, in accordance with select signal e supplied from control section 51. Hence, any address of image data memory 60 is designated by the count value of address counter 61. The count value of address counter 61, which defines the column address, is incremented by "+1" every time a clock pulse c is input to address counter 61 from timing signal-generating section 52. Thus, the addresses of image data memory 60 are sequentially designated. Timing signal-generating section 52 stops producing timing signals when the image data for one line has been written into image data memory 60. It remains to produce timing signals until it receives the next pulse from encoder 39, which indicates that the copier is being moved. The sequence of the operations described above is repeated, whereby the image data read from original B is written into image data memory 60, line by line.

It will now be explained how the hand-held copier prints the image data read from original B. To print out the image data, power/read/write switch 4 is moved to the "print" position, thereby setting the copier in the printing mode. When switch 4 is thus operated, control section 51 outputs select signals d and e, thereby switching data selector 59 and address selector 62 to control section 51. In this condition, the user sweeps the hand-held copier across a sheet of paper A in the direction of arrow X (FIG. 1), while keeping printing section 3 of head section HA in contact with paper A and depressing both operation switches 5a and 5b. As housing 1 is moved in this way, rubber rollers 25a and 25b rotate, thereby rotating gears 26, 27 and 28. Encoder disk 34, which is fastened to gear 28, therefore rotates. As a result, photosensor 37 outputs pulses, as in the case of reading the image data, which form a signal representing the distance the copier has been moved across paper A.

The rotation of gear 28 is transmitted by one-way clutch 33 to ribbon-feeding roller 23, and further to ribbon take-up roller 24 by gears 29 and 30. As rollers 23 and 24 rotate, ribbon roll 22 also rotates. Hence, ink ribbon 22a is fed from roll 22 and guided through slit 43 cut in stepped portion D. Ribbon 22a then passes by heating section 21a of thermal head 21. It is further guided through ribbon-guiding window 42, and then guided by shaft 31, ink ribbon guide 44, and ribbon-feeding roller 23. Finally, ribbon 22a is taken up around ribbon take-up roller 24. As housing 1 is moved, ribbon-feeding roller 23 rotates such that ribbon 22a is fed at the same speed as housing 1 is swept across paper A. Hence, no relative movement occurs between ribbon 22a and paper A.

The output signal of encoder 39, i.e., the output pulses of photosensor 37, which represents the distance the copier has been moved, is supplied to control section 51, timing signal-generating section 52, and speed-detecting section 53. Timing signal-generating section 52 generates print-timing signals in synchronism with the output signal of encoder 39. The print-timing signals are output to thermal head drive circuit 64. Control section 51 designates the line addresses and digit addresses of image data memory 60, in sequence, in response to the output signal of encode 39, which represents the distance the copier has been moved. The image data is thereby read out from image data memory 60 via data selector 59. Further, control section 51 calculates the time for supplying power to thermal head 21, on the basis of the temperature of head 21 detected by temperature sensor 55, the output signal of power-source voltage detector, and the density selected by rotating density control dial 7. Then, control section 51 supplies thermal head drive circuit 64 with the image data read out from image data memory 60. Thermal head drive circuit 64 drives thermal head 21 in accordance with the control data supplied from control section 51 and also in accordance with the timing signals supplied from timing signal-generating section 52. Thermal head 21, therefore, prints the image data on paper A by using ink ribbon 22a. As housing 1 of the hand-held copier is moved across paper A, the unused portion of ink ribbon 22a is fed from roll 22, and the used portion of ribbon 22a is taken up around ribbon take-up roller 24. In this way, the image data stored in image data memory 60 is printed on paper A as housing 1 of the copier is swept across paper A.

Meanwhile, control section 51 supplies a printing-mode signal to speed-detecting section 53. In response to this mode signal, maximum speed data-generating circuit 71 generates data representing the highest speed at which housing 1 can be moved to printing data. Comparator circuit 72 determines whether or not the speed of housing 1 is higher than the maximum speed, as in the case of reading image data. If it determines that the speed of housing 1 is higher than the maximum speed, comparator circuit 72 produces a "1" signal. This "1" signal is output to driver 76. Driver 76 drives LED 10, i.e., the speed alarm lamp. LED 10 emits light, thus informing the user that the copier is being moved too fast. Hence, the user sweeps the copier at a lower speed. When the speed of housing 1 is reduced, and the speed data output from counter 73 becomes less than the maximum speed data, comparator circuit 72 outputs a "0" signal, whereby LED 10, i.e., the speed alarm lamp, is turned off.

In the embodiment described above, the maximum speed data output from maximum speed data-generating circuit 71 is changed when the operation mode is switched between the reading mode and the printing mode. Such changes of the maximum speed data are unnecessary if the maximum reading speed and the maximum printing speed are the same. In this case, it suffices to supply comparator circuit 72 with the same maximum speed data at all times.

Second Embodiment

A second embodiment of the present invention will now be described with reference to FIGS. 6 to 10.

Those components of the second embodiment which are identical to the components of the first embodiment will be designated by the same numerals in FIGS. 6 to 10, and will not be explained in detail.

FIG. 6 shows the outer appearance of the hand-held copier, i.e., the second embodiment of the present invention. This hand-held copier is different from the copier of the first embodiment (FIG. 1) in that alarm buzzer 7a is provided on housing 1.

Reading section 2 and printing section 3, both arranged within housing 1 of the hand-held copier, are identical to those illustrated in FIGS. 2 and 3. Therefore, they are neither shown nor described in detail.

The electronic circuit, which is accommodated in space 18 (FIG. 2), will be described with reference to FIG. 7. Only those components the electronic circuit, which differ from the components of the electronic circuit used in the first embodiment, will be explained.

Encoder 139 comprises encoder disk 34, LEDs 36a and 36b, and photosensor 37. As housing 1 of the hand held copier is moved, encoder 139 outputs two pulse signals which are different in phase and which represent the distance the copier as moved and the direction in which the copier has been moved. The two pulse signals having a phase difference are supplied from encoder 139 to speed-detecting section 153. Speed-detecting section 135 generates a direction-change signal and encoder pulses, from the pulse signals supplied from encoder 139, which have a phase difference. The direction-change signal and the encoder pulses are supplied to control section 51 and timing signal-generating section 52. Further, speed-detecting section 153 has a counter which produces one clock pulse every time it counts seven encoder pulses. The output pulse of this counter is supplied to buzzer-driving circuit 153a. Speed-detecting section 153 has the same structure as speed-detecting section 53 of the first embodiment (see FIGS. 4 and 5). When the speed of housing 1 rises above a predetermined value, section 153 detects this fact and outputs a specific signal to LED section 50, thus turning on LED 10, i.e., a speed alarm lamp. Buzzer-driving circuit 153a drives alarm buzzer 7a for a predetermined period, in response to the counter pulse supplied from speed-detecting section 153. Speed-detecting section 153 and buzzer-driving circuit 153a will be described later in greater detail.

Control section 51 is substantially identical in structure to its equivalent used in the first embodiment. It supplies operation commands S1 and S2 to timing signal-generating section 52 when power/read/print switch 4 and operation switches 5a and 5b are operated. It supplies operation commands S1 and S2 also to speed-detecting section 153 via OR circuit OR1.

Figure 8:
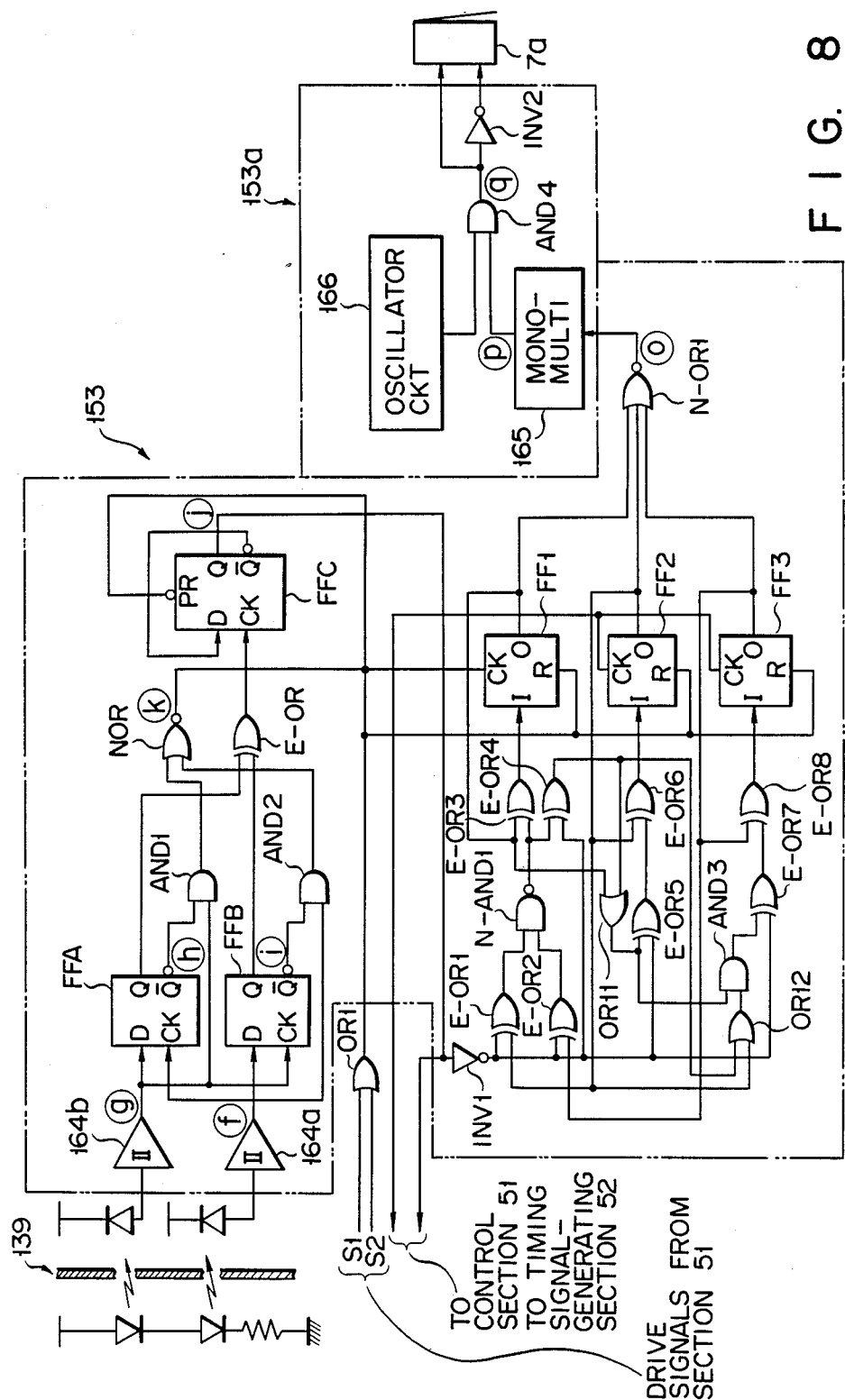
FIG. 8 is a diagram showing the speed-detecting section and the buzzer-driving circuit, both illustrated in FIG. 7.

With reference to FIG. 8, speed-detecting section 153 and buzzer-driving circuit 153a will be described in detail. Speed-detecting section 153 has components other than those shown in FIG. 8, which are equivalent to the components of speed-detecting section 53 used in the first embodiment.

The two pulse signals of different phases, which have been output from encoder 139, are amplified by amplifier/wave-shaping circuits 164a and 164b, respectively. The pulse signal amplified by wave-shaping circuit 164a is supplied to input terminal D of flip-flop $FF_A$, AND gate AND1, and clock terminal CK of flip-flop $FF_B$. The pulse signal amplified by other wave-shaping circuit 164b is supplied to input terminal D of flip-flop $FF_B$, AND gate AND2, and clock terminal CK of flip-flop $FF_A$. The inverted output of flip-flop $FF_A$ is input to AND gate AND1, and the inverted output of flip-flop $FF_B$ is input to AND gate AND2. The output signals of AND gates AND1 and AND2 are input to NOR gate NOR. The output of this NOR gate is supplied as an encoder pulse, which represents the speed of housing 1 being moved in reading or printing data, to control section 51 and timing signal-generating section 52. The output of the NOR gate is also supplied to clock terminals CK of flip-flops FF1 to FF3 which constitute scale-of-seven counter, along with exclusive-OR gates E-OR1 to E-OR8, NAND gates NAND gate N-AND1, OR gates OR1 and OR2, AND gate AND3, and NOR gate N-OR1. The Q output of flip-flop $FF_A$ or flip-flop $FF_B$ is supplied to clock terminal CK of flip-flop $FF_C$ through exclusive OR gate E-OR. Flip-flop FFC receives operation commands S1 and S2 supplied from control section 51, as preset input PR, and inputs its inverted output to its input terminal D. The Q output of flip-flop $FF_C$ is supplied, as direction-change signal, to control section 51 and timing signal-generating section 52. This Q output is also supplied via inverter INV1 to exclusive-OR gates E-OR1, E-OR2, E-OR4, E-OR5, and E-OR7 of the scale-of-seven counter.

The outputs of exclusive-OR gates E-OR1 and E-OR2 are input to NAND gate N-AND1. The output of this NAND gate N-AND1 is input to exclusive-OR gates E-OR3 and E-OR4. The output of exclusive-OR gate E-OR3 is supplied to input terminal I of flip-flop FF1. The output of flip-flop FF1 is input to exclusive-OR gate E-OR3 and NOR gate N-OR1, and also to exclusive-OR gate E-OR5 and AND gate AND3 through OR gate OR1, along with the output of exclusive-OR gate E-OR4. Moreover, the output of exclusive-OR gate E-OR5 is supplied to exclusive-OR gate E-OR6. The output of this exclusive-OR gate E-OR6 is supplied to input terminal I of flip-flop FF2. The output of flip-flop FF2 is supplied to exclusive-OR gates E-OR6 and E-OR1 and NOR gate N-OR1. This output is also supplied to OR gate OR12 to AND gate AND3, together with the output of exclusive-OR gate E-OR4. The output of AND gate AND3 is supplied to exclusive-OR gate E-OR7, the output of which is supplied to exclusive-OR gate E-OR8. The output of exclusive-OR gate E-OR8 is supplied to input terminal I of flip-flop FF3. The output of flip-flop FF3 is supplied to exclusive-OR gates E-OR8 an E-OR2 and NOR gate N-OR1. Drive signals S1 and S2 output from control section 51 are input to reset terminals R of flip-flop circuits FF1 to FF3.

The counter circuit, whose main components are flip-flops FF1 to FF3, counts the encoder pulses input via the NOR gate NOR, which represent the speed at which the copier is being moved to read or print data. It counts up the encoder pulses when the output of flip-flop $FF_C$ is at a "H" level, and counts down the encoder pulses when the output of flip-flop $FF_C$ is at an "L" level. In this instance, the Q output of flip-flop FFC is at the "H" level, indicating that housing 1 is being moved in the data-reading direction, or at the "L" level, thus showing that housing 1 is being moved in the data-printing direction. The output of NOR gate N-OR1 is supplied, as a sound-generating pulse, to monostable, multivibrator 165 provided in buzzer-driving circuit 153a.

Monostable, multivibrator 165 of buzzer-driving circuit 153a outputs a "H"-level signal for a predetermined period, in response to the sound-generating pulse signal supplied from flip-flop FF1 to FF3 of speed-detecting section 153. The output signal of this multivibrator 165 is supplied to AND gate AND4, along with the buzzer-driving signal output from oscillator circuit 166. The buzzer-driving signal is output from AND gate AND4 when multivibrator 165 outputs the "H"-level signal. The buzzer-driving signal is directly supplied to alarm buzzer 7a, and also supplied via inverter INV2 to alarm buzzer 7a. The period, during which buzzer 7a is driven, is equal to the period during which seven encoder pulses are generated while housing 1 is being moved at the maximum speed.

The operation of the hand-held copier of the structure described above will now be explained.

Figure 9:
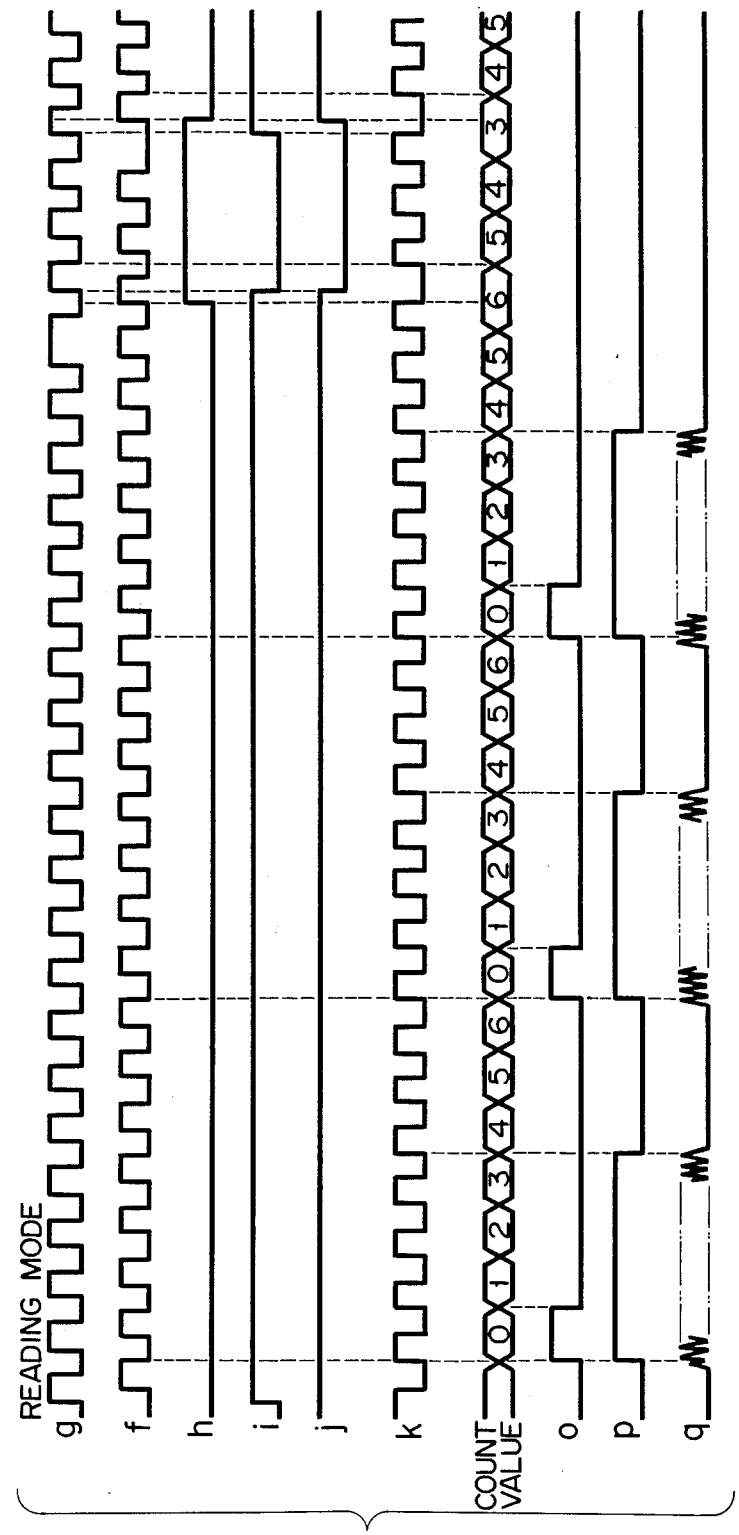
FIG. 9 is a timing chart showing the waveforms of the signals used in the speed-detecting section and the buzzer-driving circuit, both shown in FIG. 8, when the apparatus is set in a reading mode.

The user operates this hand-held copier in the same way as the hand-held copier of the first embodiment. More specifically, in order to read data, such as characters or an image, from an original, power/read/print switch 4 is moved to a "read" position. Then, the user sweeps housing 1 across original B forwardly of operation switch 5a, as is shown in FIG. 2(b), while keeping reading section 2 in contact with original B and depressing both operation switches 5a and 5b, thereby to read the data from original B. At this time, encoder 139 supplies two pulse signals of different phases to speed-detecting section 153. In response to the pulse signals from encoder 139, the various components of speed-detecting section 153 produce signals having such waveforms as are shown in FIG. 9. Distance signal k and direction signal j are supplied from speed-detecting section 153 to control section 51 and timing signal-generating section 52. Further, trigger pulse signal o is supplied from section 153 to buzzer-driving circuit 153a.

More specifically, in speed-detecting circuit 152, distance signal k is generated in synchronism with the pulses supplied from encoder 139 through wave-shaping circuit 164a. In this case, the Q output of flip-flop $FF_C$ (i.e., direction signal j) is at the "H" level. Therefore, it is determined, in control section 51 or timing signal-generating section, that housing 1 of the hand-held copier is being moved in the data-reading direction. At the same time, the counter, whose main components are flip-flops FF1 to FF3, counts the encoder pulses, and NOR gate N-OR1 outputs trigger pulse signal o every time the counter counts seven encoder pulses. Then, multivibrator 165 of buzzer-driving circuit 153a outputs sound-generating pulse signal p for the predetermined period. AND gate AND4 outputs buzzer-driving signal q, whereby buzzer 7a generates sound as long as pulse signal p is generated. That is, buzzer 7a repeatedly generates sound, each time for the predetermined period of time, at intervals equal to the period during which seven pulses of distance signal k are generated. The faster the housing of the copier is moved, the more frequently the distance signal (k) is generated, and, hence, the more often buzzer 7a generates sound. In other words, the intervals at which buzzer 7a generates sound varies in accordance with the speed at which housing 1 is moved. In the present embodiment, when housing 1 is moved at a speed higher than the maximum speed at which it can be moved to read data, the period during which seven pulses of distance signal k are produced is equal to or shorter than the period defined by sound-generating signal p. In this case, buzzer 7a continuously generates alarm sound. Therefore, the operator can easily know whether housing 1 is being moved too fast or not, just by hearing the sound which buzzer 7a is generating.

If housing 1 of the copier is moved in the opposite direction, by mistake, when the copier is set in the reading mode, distance signal k, whose cycle period changes in accordance with the speed of housing 1, is synchronous with the pulse signal output through wave shaping circuit 164b. Hence, the Q output of flip-flop $FF_C$, i.e., direction signal j, falls to the "L" level. As result, it is determined, in control section 51 or timing signal-generating section 52, that housing 1 is being swept in the direction opposite to the data-reading direction. Therefore, the counter circuit counts down the encoder pulses. In this case, buzzer 7a generates no sound, thereby informing the user that housing 1 is being moved in the direction opposite to the data-reading direction. Although control section 51 has supplied read-operation command S1 to timing signal-generating section 52, direction signal j at the "L" level is output. Therefore, the reading operation is stopped, whereby an erroneous data-reading is prevented.

In response to distance signal k output from speed-detecting section 153, timing signal-generating section 52 outputs timing signals a to A/D converting section 57, timing signals b to serial-to-parallel conversion section 58, and timing signals c to address counter 61. Hence, the data read by line image sensor 15 is stored into image data memory 60, as housing 1 of the hand-held copier is swept across original B.

In order to print the image data read from original B, too, the hand-held copier is operated in the same way as the copier of the first embodiment. More specifically, power/read/print switch 4 is moved to a "print" position. Then, the user sweeps housing 1 across paper in the direction of arrow X (FIG. 6), while keeping reading section 2 in contact with paper A and depressing operation switches 5a and 5b. As in the case of reading data, encoder 139 supplies two pulse signals of different phases to speed-detecting section 153. In response to these pulse signals supplied from encoder 139, the various components of speed-detecting section 153 output signals having such waveforms as are illustrated in FIG. 10. Distance signal k is generated in synchronism with the pulses supplied from encoder 139 through wave-shaping circuit 164b. The Q output of flip-flop $FF_C$, i.e., direction signal j, falls to the "L" level. It is therefore determined, in control section 51 or timing signal-generating section 52, that housing 1 of the copier is being swept in the data-printing direction. At the same time, the counter, whose main components are flip-flops FF1 to FF3, counts down the encoder pulses, and NOR gate N-OR1 outputs trigger pulse signal o every time the counter counts down seven encoder pulses. Multivibrator 165 of buzzer-driving circuit 153a outputs sound-generating pulse signal p for the predetermined period. AND gate AND4 outputs buzzer-driving signal q, whereby buzzer 7a generates sound as long as pulse signal p is generated. That is, buzzer 7a repeatedly generates sound, each time for the predetermined period of time, at intervals equal to the period during which seven pulses are generated. The faster the housing 1 is moved, the more frequently the distance signal (k) is generated, and, hence, the more often buzzer 7a generates sound. In other words, the intervals at which buzzer 7a generates sound varies in accordance with the speed at which housing 1 is moved. In the present embodiment, when housing 1 is moved at a speed higher than the maximum speed at which it can be moved to print data, the period during which seven pulses of distance signal k are produced is equal to or shorter than the period defined by sound-generating signal p. Hence, buzzer 7a continuously generates alarm sound. Hearing the sound being generated by buzzer 7a, the operator can easily understand whether housing 1 is being moved too fast or not. If housing 1 of the copier is moved, by mistake, in the direction opposite to the direction in which housing 1 must be swept to print data when the copier is set in the printing mode, the Q output of flip-flop $FF_C$, i.e., direction signal e, rises to the "H" level. Therefore, it is determined, in control section 51 or timing signal-generating section 52, that housing 1 is being swept in the opposite direction. Direction signal e is at the "H" level though control section 51 has supplied data-print command S2 to timing signal-generating section 52. Hence, the printing operation is stopped, whereby an erroneous data-printing is prevented.

In the meantime, timing signal-generating section 52 outputs a one-line print command to control section 51, in response to distance signal k which has been supplied from speed-detecting section 153. Further, section 52 outputs a print timing signal to thermal head drive circuit 64, also in response to distance signal k. Still further, in response to distance signal k, control section 51 designates the row addresses and column addresses of image data memory 60, one after another, thereby reading the image data from image data memory 60. The image data is output to thermal head drive circuit 64 through data selector 59, line by line.

With the hand-held copier described above, the user can easily know how fast he is sweeping housing 1 to either read or print data, from the frequency at which buzzer 7a generates alarm sound. The user can therefore change the speed of housing 1 to an optimum data-reading or data-printing speed. Moreover, since the direction, in which housing 1 is moved, can be determined, an erroneous data-reading, or an erroneous data-printing can be prevented when housing 1 of the copier is swept in a wrong direction by mistake.

In the second embodiment, a buzzer is used as an alarm means. Nonetheless, an LED can be used instead. Alternatively, any other alarm means can be used which can help the user to perceive the speed at which he or she is moving the copier, either aurally or visually.

Third Embodiment

A third embodiment of the present invention will now be described with reference to FIGS. 11 to 13.

Figure 12:
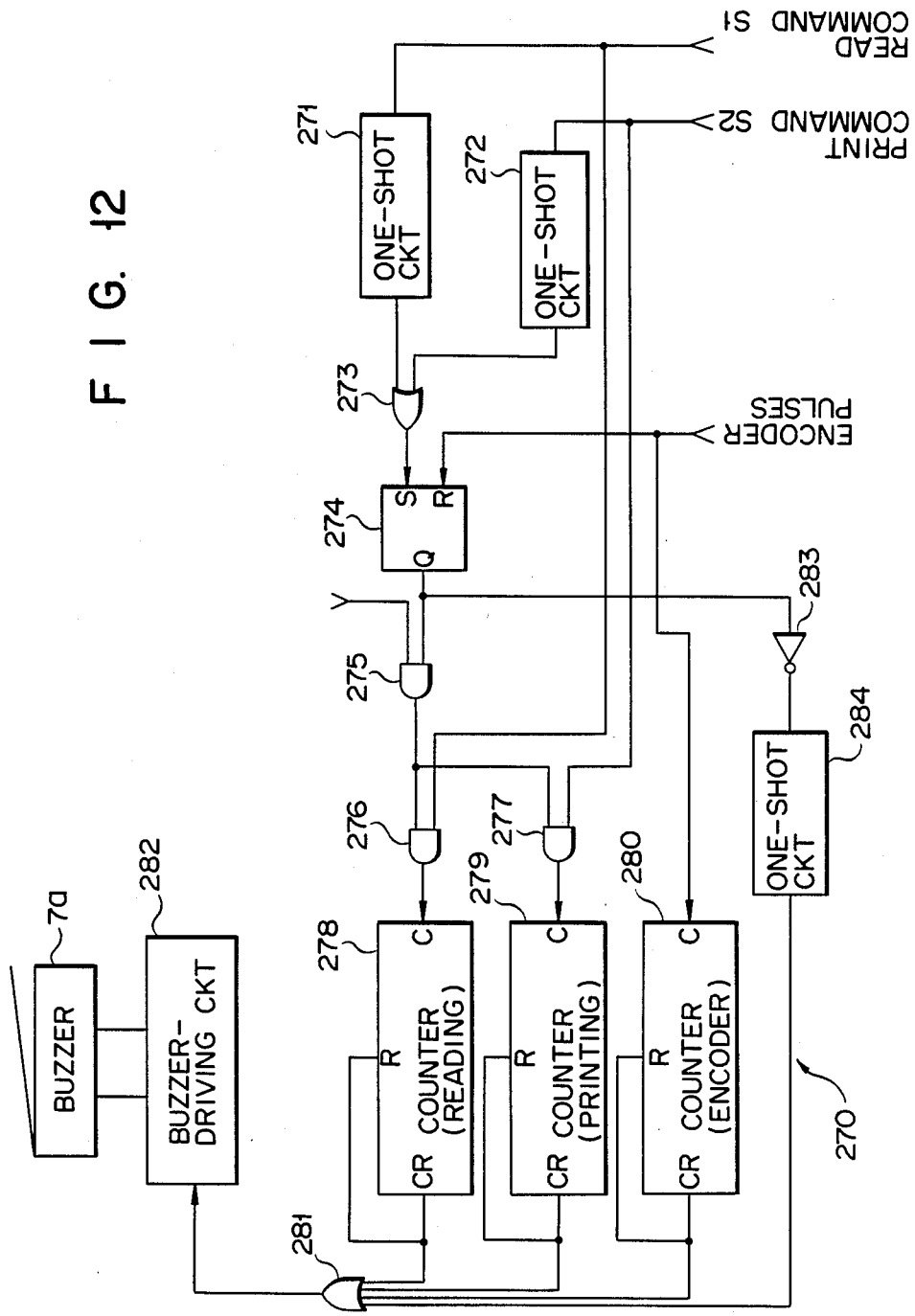
FIG. 12 is a block diagram showing, in detail, the buzzer-driving circuit shown in FIG. 11.

Those components of the third embodiment, which are identical to the components of the first ad second embodiments, will be designated by the same numerals in FIGS. 11 and 12, and will not be explained in detail.

The outer appearance of the hand-held copier of the third embodiment is the same as that of the second embodiment (see FIG. 6). Reading section 2 and printing section 3, both provided within housing 1, are identical in structure to those of the first and second embodiment.

The electronic circuit, which is accommodated in 18 (FIG. 2), has the structure illustrated in FIG. 11.

Encoder 39 outputs pulse signals representing the distance housing 1 of the copier has been moved, i.e., distance signals. More precisely, it produces two pulse signals which are different in phase. For the sake of simplicity, the encoder 39 will be considered as one for generating only one pulse signal. The pulse signal output from encoder 39 is supplied to speed-detecting section 53, control section 51, timing signal-generating section 52, and buzzer-driving section 270.

Operation commands S1 and S2 are supplied to buzzer-driving section 270 from control section 51. Buzzer-driving section 270 supplies a buzzer-driving signal to buzzer 7a. Section 270 drives buzzer 7a at prescribed intervals before the copier is manually moved after the copier has been set in a reading mode or a printing mode. While the copier is being manually moved, buzzer-driving section 270 drives buzzer 7a every time housing 1 of the hand-held copier is moved for a predetermined distance. Section 270 is shown in FIG. 12 in detail.

Buzzer-driving section 270 shown in FIG. 12 is designed to drive buzzer 7a appropriately when the optimum speed at which housing 1 should be moved to read data is 5 cm/sec, and the optimum speed at which housing 1 should be moved to print data is 1 cm/sec. Read command S1 and print command S2, both supplied from control section 51, are one-shot circuits 271 and 272, respectively. The outputs of both one-shot circuits 271 and 272 are supplied via OR circuit 273 to set terminal S of flip-flop 274. Flip-flop 274 is reset by the encoder pulse output from encoder 39. The output signal of this flip-flop 274 is input to AND circuit 275, along with clock pulse $\phi$. The output signal of AND circuit 275 is input to AND circuits 276 and 277. Read command S1 is also input to AND circuit 276. The output signal of AND circuit 276 is input to clock terminal C of counter 278 for generating read-timing signals. Print command S2 is input to AND circuit 277, and the output signal of AND circuit 277 is input to clock terminal C of counter 279 for generating print-timing signals. The encoder pulses supplied from encoder 39 are input to clock terminal C of counter 280 for generating sub-scanning timing signals. Carry outputs CR of counters 278, 279 and 280 are input to reset terminals R of these counters, respectively. These carry signals CR are also supplied via OR circuit 281 to buzzer-driving circuit 282. Counter 278 is designed so as to output carry signals CR at intervals of, for example, 1/5 second, while clock pulse $\phi$ is being supplied to it through AND circuits 275 and 276. Counter 279 is designed so as to output carry signals CR at intervals of, for instance, one second, while clock pulse $\phi$ is being supplied to it through AND circuits 275 and 277. Counter 280 is designed so as to output a carry signal CR in accordance with the encoder pulses, every time housing 1 of the hand-held copier is moved for, for example, one centimeter. The output signal of flip-flop 274 is input to one-shot circuit 284 via inverter 283. The output signal of one-shot circuit 284 is supplied to buzzer-driving circuit 283 through OR circuit 281. Buzzer-driving circuit 283 drives buzzer 7a momentarily, e.g., for 30 ms, every time it receives the signals supplied from counters 278 to 279 and one-shot circuit 284 through OR circuit 281 buzzer 7a and counters 278 and 279 comprise a guidance means for the operator, as will become clearer from the following discussion.

The operation of the hand-held copier described above will now be explained. In order to read information, such as characters and an image, from an original, power/read/print 4 is moved from a "power-off" position to a "read" position. As soon as power/read/print switch 4 is moved to the "read" position, the power is supplied to the electronic circuit, whereby the components of the circuit are turned on. At this time, control section 51 gives read command S1 to timing signal-generating section 52. In response to command S1, section 52 generates various timing signals. Further, control section 51 supplies read command S1 to buzzer-driving section 270, whereby buzzer 7a generates sound informing of the best possible speed at which the hand-held copier should be moved. More specifically, as is shown in the flow chart of FIG. 13, it is determined in step A1 whether or not encoder pulses have been received. If no encoder pulses have been received, it is determined in step A2 whether or not time t (i.e., 1/5 second when the read mode has been selected) has passed. If NO, the operation returns to step A1. Upon lapse of 1/5 second, the operation goes from step S2 to step A3, provided no encoder pulses have not been received yet. In step A3, buzzer 7a is driven. Then, the operation returns to step A1, and buzzer 7a generates sound at intervals of 1/5 second until the user starts sweeping the hand-held copier.

The sound-generating operation described above is achieved by buzzerdriving section 270 shown in detail in FIG. 12, in the following manner. When read command S1 is supplied from control section 51 to buzzer-driving section 270, one-shot circuit 271 is triggered, and, at the same time, AND circuit 276 is gate-controlled. Upon receipt of read command S1, one-shot circuit 271 generates a one-shot pulse. This one-shot pulse is supplied via OR circuit 273 to flip-flop 74, thereby setting flip-flop 274. As a result, the output signal of flip-flop 274 changes to a "1" signal, thus opening the gate of AND circuit 275. Hence, clock pulse $\phi$ is input to counter 278 through AND circuits 275 and 276. Counter 278 begins a counting operation, and generates carry signals CR at intervals of 1/5 second. These carry signals are supplied via OR circuit 281 to buzzer-driving circuit 282. Buzzer-driving circuit 282 drives buzzer 7a at intervals of 1/5 second, whereby buzzer 7a generates sound to inform the user of the best possible speed at which the hand-held copier should be moved in order to read data.

The user operates the hand-held copier in the same way as those of the first and second embodiments. More precisely, the user sweeps housing 1 across original B forwardly of operation switch 5a, as is shown in FIG. 2(b), while keeping reading section 2 in contact with original B and depressing both operation switches 5a and 5b. As the hand-held copier is thus moved, encoder 39 generates a pulse signal representing the distance for which housing 1 has been moved. This pulse signal is supplied to control section 51 and buzzer-driving section 270. When the pulse signal is supplied from encoder 39 to buzzer-driving section 270, the operation within section 270 advances from step A1 to A4. In step A4, buzzer 7a is momentarily driven. Thereafter, in step A5, it is determined whether or not housing 1 has been moved for distance l, from the encoder pulses. If YES, the operation returns to step A4, in which buzzer 7a is driven. That is, every time an encoder pulse is supplied to buzzer-driving section 270, flip-flop 274 is reset. As a result, the output of flip-flop 274 changes to "0", and the output of inverter 283 changes to "1". Hence, one-shot circuit 284 is triggered. Circuit 284, therefore, outputs a one-shot pulse, which is supplied to buzzer-driving circuit 282. In response to this one-shot pulse, circuit 282 drives buzzer 7a for 30 ms. Since the output of flip-flop 274 is "0", the gate of AND circuit 275 is closed, whereby clock pulses $\phi$ can no longer be input to counter 278. Therefore, counter 278 stops its operation. As housing 1 of the hand-held copier is further manually moved, encoder 39 sequentially outputs pulses. Counter 280 counts up these pulses. Counter 280 outputs a carry signal CR every time housing 1 is moved for 1 cm. In response to this carry signal, buzzer-driving circuit 282 drives buzzer 7a. Thus, buzzer 7a generates sound every time housing 1 is moved for 1 cm. Therefore, the use sweeps housing 1 at such a speed that buzzer 7a generates sound at intervals of one second, i.e., the same intervals as buzzer 7a has generated before the hand-held copier is moved. Hence, the hand-held copier can be moved manually at the optimum speed.

In the meantime, timing signal-generating section 52 generates CCD-exposure timing signals at predetermined intervals in response to read command S1 supplied from control section 51, as in the first embodiment. The CCD-exposure timing signals are supplied to line image sensor 15. Further, section 52 generates read-timing signals a and serial-to-parallel conversion signals b, in response to the pulse signal supplied from encoder 39. Read-timing signals a are supplied to A/D converting section 57, and serial-to-parallel conversion signals b are supplied to serial-to-parallel conversion section 58. Further, timing signal-generating section 52 generates clock pulses c in synchronism with serial-to-parallel conversion signals b. Clock pulses c are input to address counter 61. Therefore, the image data read by line image sensor 15 is stored into image data memory 60 as housing 1 of the hand-held copier is moved.

It will now be explained how the hand-held copier is operated to print the image data read from original B.

To print the image data, power/read/print switch 4 is moved to the "print (PR)" position. When switch 4 is thus moved, print command S2 is supplied to buzzer-driving section 270. Then, in section 270, one-shot circuit 272 is triggered, and AND circuit 277 is gate-controlled. Upon receipt of print command S2, one-shot circuit 272 generates a one-shot pulse. This one-shot pulse is supplied via OR circuit 273 to flip-flop 274, thus setting this flip-flop. The output of flip-flop 274 changes to "1", thereby opening the gate of AND circuit 275. As a result, clock pulses $\phi$ are supplied to counter 279 through AND circuits 275 and 277. Counter 279 counts up these clock pulses $\phi$, and generates carry signals at intervals of one second. These carry signals are output to buzzer-driving circuit 282 through OR circuit 281. In response to the carry signals from counter 278, buzzer-driving circuit 282 drives buzzer 7a at intervals of one second, so that buzzer 7a generates sound at intervals of one second, thus informing the user of the best possible speed at which housing 1 should be moved in order to print data. Buzzer 7a keeps on generating sound until the user sweeps housing 1 to print the data.

Then, the user sweeps housing 1 across paper A in the direction of arrow X (FIG. 1), while keeping reading section 2 in contact with paper A and depressing operation switches 5a and 5b. As in the case of reading data, encoder 39 outputs a pulse signal representing the distance which housing 1 has been moved, while housing 1 is being moved.

The output pulses of photosensor 37 are supplied, as the output signal of encoder 39, to buzzer-driving section 270 and control section 51. In response to the output signal of encoder 39, which has been supplied to section 270, flip-flop 274 is reset. The output signal of flip-flop 274 changes to "0", and the output of inverter 283 changes to "1". One-shot circuit 284 is triggered, and generates a one-shot pulse. In response to this one-shot pulse, buzzer-driving circuit 282 momentarily drives buzzer 7a. Counter 280 counts up the pulses supplied from encoder 39, and outputs a carry signal every time housing 1 is moved for 1 cm. In response to this carry signal, buzzer-driving circuit 282 drives buzzer 7a. Therefore, buzzer 7a generates sound every time housing 1 is moved for 1 cm. Hence, if the user moves housing 1 such that buzzer 7a generates sound at the same intervals as it has before housing is manually moved, housing 1 will be moved at 1 cm/sec, i.e., the optimum speed for data-printing.

Meanwhile, control section 51 sequentially designating the row addresses and column addresses of image data memory 60, in accordance with the signal supplied from encoder 39 and representing the distance the hand-held copier has been moved. Thus, the image data is read from image data memory 60 and supplied via data selector 59 to thermal head drive circuit 64. Thermal head drive circuit 64 drives thermal head 21 in accordance with the image data and the control signal, both supplied from control section 51. Thermal head 21, therefore, prints the image data on paper A. Hence, as housing 1 of the hand-held copier is moved in the direction of arrow X, the data read from original B and stored in image data memory 60 is printed on paper A.

We claim:

1. A manual sweeping apparatus, comprising:
    housing means for manually sweeping across one of an original having image information thereon and a recording medium;
    image information reading means provided in said housing means for reading image information which is on the original while said housing means is manually swept across the original having the image information thereon;
    printing means provided in said housing means for printing the image information on the recording medium while said housing means is manually swept across the recording medium;
    position-detecting means for detecting the position of said housing means being swept across one of the original and the recording medium, and for producing a detecting signal every time said housing means is swept across a predetermined distance;
    mode-selecting means for selecting one of a reading mode and a printing mode;
    control means for controlling said image information reading means and said printing means based on a detecting signal output from said position-detecting means in accordance with the mode selected by said mode-detecting means;
    indicating means for indicating a relative state between a manual sweeping speed of said housing means obtained based on the detecting signal output from said position-detecting means and an operating speed of one of said image information reading means and said printing means in accordance with the mode selected by said selecting means.

2. The manual sweeping apparatus of claim 1, wherein said indicating means includes:
    signal generating means for generating a first intermittent signal when the manual sweeping speed of said housing means is slower than the operating speed of one of said image information reading means and said printing means in accordance with the mode selected by said selecting means, and for generating a continuous signal when the manual sweeping speed of said housing means is faster than the operating speed of one of said image information reading means and printing means in accordance with the mode selected by said selecting means; and
    informing means for informing an operator as to which of said first intermittent signal and said continuous signal is being generated by said signal generating means.

3. The manual sweeping apparatus of claim 2, wherein said signal generating means includes means for generating said first intermittent signal of which an interval is long in response to the manual sweeping speed of said housing means and which is obtained based on a detecting-signal output from said position detecting means.

4. The manual sweeping apparatus of claim 3, further comprising:

guidance means for generating a second intermittent signal of which an interval is as long as the interval of the first intermittent signal generated by said signal generating means when said housing means is manually swept with an appropriate speed.

5. The manual sweeping apparatus of claim 4, further comprising:

activating means for activating said guidance means for generating said second intermittent signal from the time when the mode is selected by said mode-selecting means until the detecting signal is generated by said position-detecting means.

6. The manual sweeping apparatus of claim 2, wherein said indicating means includes:

counting means for counting a number of times which the detecting-signal is output from said position-detecting means, and for outputting a signal every time the counting number of times is a predetermined number; and wherein said signal-generating means includes means for generating said first intermittent signal every time said counting means generates said signal, the length of said signal being as long as a length of an interval during which two signals are output from said counting means when the manual sweeping speed of said housing means is equal to the operating speed of one of said image information reading means and said printing means in accordance with the mode selected by said mode-selecting means.

* * * * *